Aug. 31, 1954
D. MacINTYRE
2,688,047
VIBRATION DAMPER
Filed Aug. 28, 1951
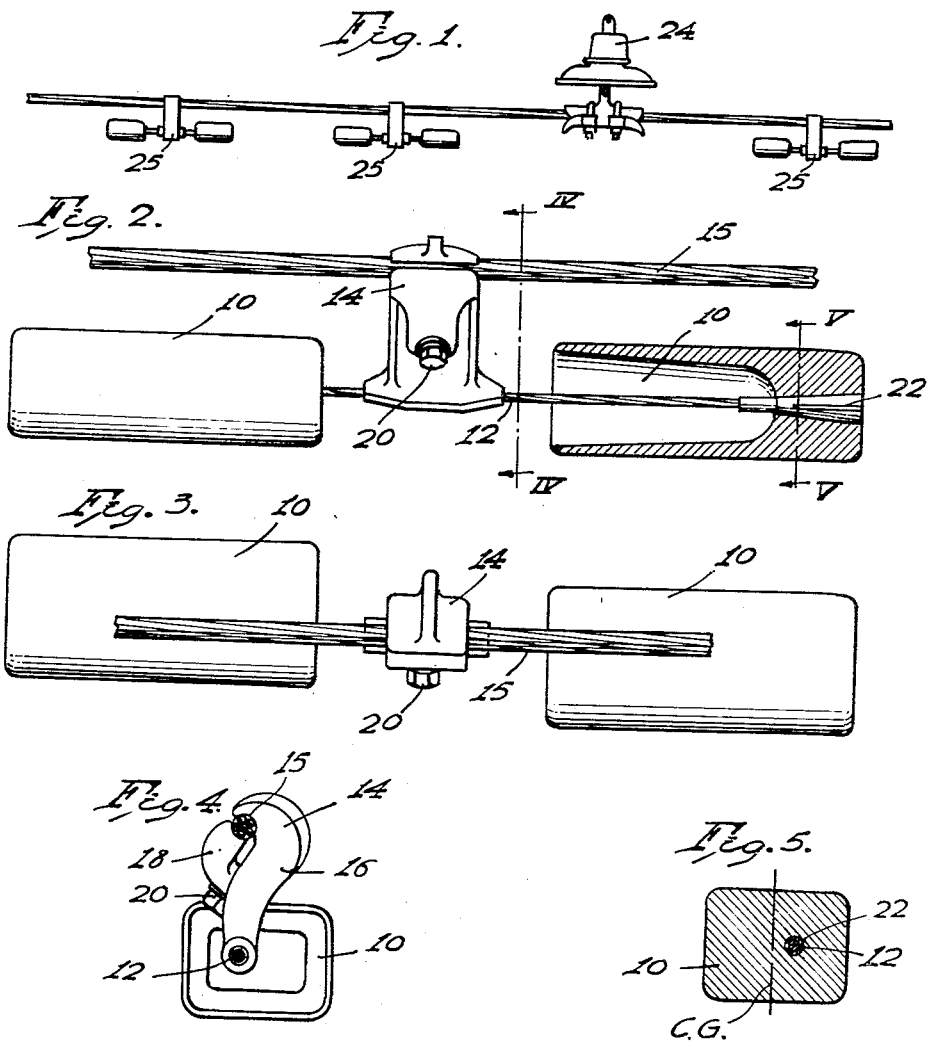
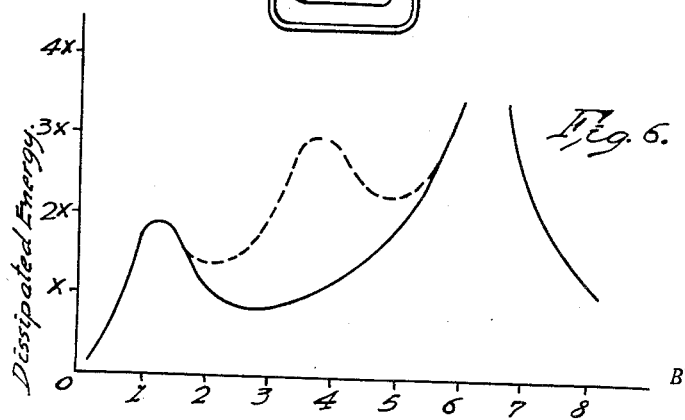
INVENTOR.
David MacIntyre.
BY
S. Ernest Low
ATTORNEY:-

UNITED STATES PATENT OFFICE 2,688,047

VIBRATION DAMPER

David MacIntyre, Pittsburgh, Pa., assignor to Aluminum Company of America, Pittsburgh, Pa., a corporation of Pennsylvania Application August 28, 1951, Serial No. 243,947

3 Claims. (Cl. 174—42)

The invention, hereinafter described, relates in general to vibration damping devices, and is particularly directed to improved vibration dampers for electrical transmission cables, and the like.

Several years of research and laboratory and field testing has made it possible to make certain definite pronouncements regarding the analysis and explanations of the causes and nature of wind-induced harmonic vibrations in cables, and similar members susceptible to vibration, as well as determine the stresses in said members as a result of their vibration.

Electric power transmission cables, suspended and stretched above ground level between their usual tower supports, are subject to resonant vibration caused by the wind. The reason for this vibration has been explained in the art in terms of being a direct result of wind blowing across the cable, which sets up eddy currents on the lee side of the cable. These eddy currents have a definite frequency of oscillation depending upon the velocity of the wind. The frequency of vibration of a cable subjected to wind can be expressed very closely by the formula:

$$F = 3.26 \frac{V}{d}$$

where $f$ equals frequency of vibration in oscillations per second; V equals velocity of wind normal to the cable in miles per hour; and $d$ equals diameter of the cable in inches. Where the direction of the wind is not horizontal or directly across the cable, the component of the wind perpendicular to the cable should be substituted in the previous formula. The aforementioned eddy currents, formed on the leeward side of the cable, set up partial vacuums, first above the horizontal diameter of the cable, and then below its horizontal diameter, with the net result that minute vibration impulses are imparted to the cable. The wind seldom blows for long periods of time at a uniform velocity or in a fixed direction, and it is a normal rather than an abnormal condition, to find the eddy currents varying in frequency, thereby making it possible for the cable to vibrate with a frequency corresponding to the whole number of loops that fits in best with the sum total of varying eddy currents. It will be observed from the foregoing explanation that a cable will have a range of frequencies of vibrations to select from, thereby making vibration of more frequent occurrence than would be the case if the wind were always absolutely uniform.

Under many conditions of vibration in suspended cables, the amplitudes of the vibrations will develop alternating stresses of sufficient intensity to produce fatigue failures in the cable strands. Once vibration is started, each resultant vibration loop contributes an impulse to maintain vibration, and the vibration loops assume a form of vertical displacement of the cable that has been shown to be practically that of a sine wave, when the flexural rigidity of the stranded length of cable is relatively small in comparison to its length.

The passing of the cable through its series of sinusoidal formed curves, in response to vibration, gives rise to variations in reverse bending stresses that often result in fatigue failure and breakage of the cable, particularly adjacent its points of support.

The vibration damper described and illustrated in United States Patent 1,675,391 to Stockbridge is a notable example of a damper that dissipates energy by both friction between moving parts or elements thereof and internal friction in the stressed portions of the damper. The Stockbridge damper generally incorporates two inertia weights or masses suspended from a conductor cable to which the damper has been attached. The inertia weights are attached to the ends of a double cantilever arm, in the form of a steel wire cable, which in turn is clamped on the cable whose vibrations require damping. Field and laboratory tests of this damper have shown it to give excellent results and it has received widespread acceptance and use in overhead transmission line installations.

On analysis, it has been found that the Stockbridge damper has two natural frequencies of vibration within the range of frequencies usually encountered in service. One of its frequencies is termed its lower natural frequency, which can be defined in terms of the oscillation of the damper weights in a plane and through reverse bending of the weight-supporting or messenger cable substantially about its point of attachment within the clamp supporting the damper below the main transmission cable. The second frequency of the Stockbridge type damper is termed its upper natural frequency. This upper natural frequency is definable in terms of the oscillation of the damper weights in a plane and substantially about their points of attachment, which preferably coincide with the centers of gravity of the individual weights, to the free ends of the resilient cable supporting the weights. In no analysis of the particular operation of a Stockbridge type damper has any evidence been produced to indicate that this general type of damper develops interstrand friction between the strands of the main transmission cable to which it is rigidly attached. Any frictional damping effect resulting from the use of a Stockbridge damper has been determined to be confined to the damping resulting from hysteresis loss within the elements of the damper itself.

Distinguishing from the vibration dampers described and illustrated in the aforementioned Stockbridge patent are the type of dampers described in United States Patents 2,215,541, 2,219,893 and 2,271,935. Therein, damping weights are attached to rigid arms projecting laterally away from the vertical plane of the longitudinal axis of a transmission cable to eccentrically load and apply a torque on the same.

It is an object of the present invention to provide an improved form of Stockbridge damper for preventing objectionable and failure-causing vibrations in transmission lines, and similar vibrating members.

Another object of the invention is to increase the vibration damping characteristics of dampers, employing resiliently supported inertia weights below and in substantially the vertical plane of the longitudinal axis of a conductor or transmission cable.

A further object is to provide a Stockbridge type damper characterized by having an additional natural frequency of vibration, which lies between the lower and upper natural frequencies inherent in presently employed Stockbridge dampers.

Other objects and advantages will be readily understood on consideration of the following description, when read in the light of the drawing attached hereto and forming a part hereof, in which:

Fig. 1 represents a somewhat diagrammatic elevational view of a section of transmission line to which vibration dampers of the type falling within the concept of the invention have been affixed;

Fig. 2 is an enlarged elevational view, partly in section, of a single damper attached to the transmission line;

Fig. 3 is a top plan view of the arrangement illustrated in Fig. 2;

Fig. 4 represents a sectional elevation taken on the plane IV—IV of Fig. 2;

Fig. 5 represents a sectional elevation taken on the plane V—V of Fig. 2; and,

Fig. 6 represents a graphical illustration of a dissipation energy curve for a vibration damper designed and operated in accordance with the teachings of the invention.

The improved and novel vibration damper forming the basis of the present invention, is now described in terms of its adaptation to stranded transmission cable. It is to be understood, however, that it is in no way limited in its utility in application to cables, but that it may be employed in combination with any member susceptible to vibration.

A representative embodiment of the invention comprises two inertia members or weights 10 joined together by means of a resilient member 12, preferably in the form of a short length of stranded steel cable. The resilient member 12 is engaged intermediate its ends, and preferably substantially at its center, by a clamping device 14, which is adapted to engage a transmission line 15, to which the damper is rigidly affixed. The clamping member 14 briefly comprises a hook-shaped clamp body 16 and a movable clamping arm or keeper 18, the arm 18 being movable with respect to the body portion 16 for securely clamping the cable 15 between complementary, curved, cable engaging surfaces carried by the clamp body and arm, respectively. A fastening device, such as a cap screw 20, extending through the arm 18 into threaded engagement within an aperture in the body member 16, serves to rigidly attach the damper on the cable 15.

The inertia members or weights 10 are preferably, but not necessarily, cup-shaped or tubular members having thickened end portions suitably recessed to receive the ends of the resilient cable 12. The cable 12 is secured within the recesses in the thickened ends of the inertia members 10 by any suitable means, such as is provided by the tapered split compression collet 22.

The damping device of the invention thus far described is similar to that described and illustrated in United States Patent 1,992,538, and it is this type of damper that has been analysed, in laboratory and field testing to exhibit upper and lower natural frequencies of vibration.

An added feature, distinguishing the novel damper of the present invention over the prior art, is concerned with the mounting of the inertia members 10 eccentrically upon their connecting cable 12, at its unrestrained ends. This will be more clearly observed on reference to Figs. 3, 4 and 5, wherein the weights 10 are laterally offset in respect to a substantially vertical plane passing through the central axes of the main cable 15 and vibration damper, weight-connecting cable 12. It is this eccentric mounting of the inertia weights 10 that imparts an additional natural vibration frequency or frequencies to the vibration dampers of this invention, this additional frequency or frequencies being definable in terms of an oscillatory movement of the weights 10 in a radial direction about their fixation points on the resilient weight-connecting cable 12, as well as about the longitudinal axis of the cable 12. This oscillatory movement of the inertia weights 10 introduces further vibration damping and energy dissipating forces in the form of additional interstrand friction between the strands of the weight-connecting cable 12. As illustrated in Fig. 3, the inertia weights are arranged, in their eccentric mounting on cable 12, on opposite sides of the longitudinal axis thereof.

The full line curve in Fig. 6 graphically illustrates a natural frequency and dissipated energy curve derived from mathematical analyses and laboratory tests conducted on a standard, two-weight Stockbridge type damper. The curve contains two upwardly projecting peaks located at frequencies which are the two natural frequencies of the damper within the range of frequencies normally encountered in service. The smaller peak represents dissipated energy absorption at the lower natural frequency of vibration, and the larger peak represents the dissipated energy absorption at the upper natural vibration frequency. The superimposed dotted line curve was derived from laboratory tests conducted on a similar two-weight, Stockbridge type damper in which the weights were offset laterally in accordance with the invention. The apparatus employed in this test was a vibration-imparting apparatus operated at constant amplitude and varying frequency. It is to be observed that the dotted line curve represents a third natural frequency lying between the lower and upper natural frequencies of the standard form of Stockbridge damper.

The superimposed dotted line peak also graphically illustrates energy absorption at this third natural frequency, which is the result of the eccentrically mounted inertia weights of the damper of the invention. The amount of energy dissipated by the damper of the invention is proportional to the ordinates under the composite curve, the amount of additional energy dissipated by the eccentrically mounted weights being an increase over the standard Stockbridge two-weight damper in that region where the dotted line curve lies above the full line curve.

The precise number of improved dampers of the invention, that should be used in any particular transmission cable installation, is dependent upon the length of span, the outside diameter and weight of the transmission line cable to be protected, and the usual further factors ordinarily considered in determining the number and position of previously known types of dampers. Fig. 1 is merely illustrative of a portion of a conductor span, attached as by insulators 24 to transmission towers properly spaced in respect to a size and weight of cable under consideration. The improved dampers of the invention are illustrated at 25, the dampers being normally and usually attached to the cable near or adjacent its points of support.

Although the improved vibration damper of the invention has been described in terms of two inertia weights 10, equally spaced from the center of their resilient connecting cable 12, the connecting cable 12 may be rigidly secured in its clamp 14 at a point other than its center to thus impart an unbalanced condition to the inertia weights 10 along the axis of cable 15, as viewed in Figs. 2 and 3. It is essential, however, that the damper weights 10 be laterally offset, in respect to a vertical plane through the axis of the messenger cable 12, on opposite sides thereof, to eliminate any torsional effect of the weights 10 on the main cable 15.

As previously stated, the invention has been described with special reference to an embodiment thereof in association with a stranded, power transmission cable. It is to be understood that this particular adaptation of the damper is only by way of illustration and not limitation.

What is claimed is:

1. A self-contained vibration damper comprising a pair of spaced inertia weights connected by a double cantilever-supported resilient member, said inertia weights having their centers of gravity offset laterally on opposite sides of the axis of the double cantilever-supported resilient member.

2. A vibration damper comprising a pair of inertia weights connected by an elongated resilient member, an attachment clamp for the damper secured to the elongated resilient member intermediate the inertia weights, and said inertia weights having their centers of gravity offset laterally on opposite sides of a plane containing the axis of the elongated resilient member and the attachment clamp.

3. A vibration damper comprising a pair of inertia weights connected by an elongated resilient cable, an attachment clamp for the damper secured to the elongated resilient cable substantially centrally of the inertia weights, and said inertia weights having their centers of gravity offset laterally on opposite sides of a plane containing the axis of the elongated resilient cable and the attachment clamp.

References Cited in the file of this patent

UNITED STATES PATENTS

| Number | Name | Date |
| --- | --- | --- |
| 1,992,538 | Monroe et al. | Feb. 26, 1935 |
| 2,215,541 | Buchanan et al. | Sept. 24, 1940 |

FOREIGN PATENTS

| Number | Country | Date |
| --- | --- | --- |
| 554,712 | Germany | July 14, 1932 |